US005145054A

United States Patent [19]

Nelson

[11] Patent Number: 5,145,054

[45] Date of Patent: Sep. 8, 1992

[54] VIBRATORY FEEDER VOLTAGE CONTROL

[75] Inventor: Steven D. Nelson, Rockford, Ill.

[73] Assignee: Rodix, Inc., Machesney Park, Ill.

[21] Appl. No.: 679,656

[22] Filed: Apr. 2, 1991

[51] Int. Cl.[5] .............. B65G 43/00

[52] U.S. Cl. .............. 198/751; 198/524

[58] Field of Search .............. 198/751, 524

[56] References Cited

U.S. PATENT DOCUMENTS

| | | | |
|---|---|---|---|
| 3,922,589 | 11/1975 | Peckingham | 318/126 |
| 4,101,816 | 7/1978 | Shepter | 318/130 |
| 4,216,416 | 8/1980 | Grace | 318/128 |
| 4,300,083 | 11/1981 | Heiges | 318/686 |
| 4,331,263 | 5/1982 | Brown | 198/751 X |
| 4,369,398 | 1/1983 | Lowry | 198/751 X |
| 4,456,822 | 6/1984 | Rose et al. | 250/223 |

*Primary Examiner*—Robert P. Olszewski
*Assistant Examiner*—Dean A. Reichard
*Attorney, Agent, or Firm*—Leydig, Voit & Mayer

[57] ABSTRACT

A control for regulating the AC voltage provide to a vibratory feeder, which includes electronic circuitry for generating a "desired" voltage signal, feedback circuitry for generating an "actual" voltage signal, a logic circuit for comparing the "desired" and "actual" voltage signals and generating a difference signal, and a controller which uses the difference signal to generate a control signal for regulating the AC voltage provided to the feeder. An initialization circuit enables the control a predetermined time after AC power is applied and an automatic relay couples a DC power source to the control for selective adjustment of the control output. A fault circuit automatically shuts down the control if the feedback signal is lost when the "desired" voltage signal is at or turned down to a predetermined level. A maximum AC output indicator identifies the optimum setting for a maximum output adjustment, regardless of load, and a ramp function determines the build-up and decay of the AC output voltage. Logic circuits are utilized in conjunction with the control for independently setting "on" and "off" delay periods and for controlling the on/off operation of the control in response to high and low sensor signals relating to backlogs of parts.

27 Claims, 6 Drawing Sheets

VIBRATORY FEEDER VOLTAGE CONTROL

TECHNICAL FIELD

The present invention relates generally to a vibratory feeder control and, more particularly, to an AC voltage control.

BACKGROUND ART

Vibratory feeders for small parts such as screws, nuts, plastic pieces and so on are generally AC powered and electromechanically tuned to either a 60 or 120 cycle per second frequency. For bowl-type feeders, a bowl for the parts which includes a spirally ascending track interiorally or externally about its circumference is mounted on an intermediate portion which rests on a base. The intermediate portion is coupled to an AC power source through a power control and is electromagnetically tuned to vibrate the bowl. Vibration of the bowl causes the parts to move upwardly along the spiral track. These parts then move to a machine feed track where they are temporarily stored for feeding into an assembly machine.

Prior art controls have typically included means for adjusting the desired voltage to be provided to vibratory feeders. One example of a prior art control is described in U.S. Pat. No. 4,456,822, having a power control triac which fires when the voltage on a capacitor exceeds the trigger voltage of a diac coupled to the gate of the triac. This diac/triac control is, of course, susceptible to AC power fluctuations, because the triac will not fire unless the AC power provided raises the voltage on the capacitor above the diac trigger voltage. Thus, AC line power fluctuation, which is typical in an industrial environment, will cause a feeder controlled by one of these prior art diac/triac units to operate erratically. The prior art diac/triac control also suffers the disadvantage of not permitting low voltage levels to be supplied to the feeder, since commercially available diacs require at least a voltage input of above 10 V for triggering.

Still other prior art controls have merely utilized variable transformers for firing the feeder bowl drive, but the output voltage of these controls are also susceptible to AC power fluctuation.

The prior art controls have lacked logic circuits, such as feedback and comparator circuits, by means of which the actual AC voltage provided to the feeder can be monitored and maintained constant. Consequently, the vibratory action of feeders controlled by these prior art controls can be erratic if the AC line voltage fluctuates.

SUMMARY OF THE INVENTION

It is, therefore, a primary object of the present invention to provide an improved control which provides a constant desired AC voltage to a vibratory feeder, independent of AC line fluctuations.

Another object of this invention is to provide a vibratory feeder control in which the desired AC voltage can be easily selected and/or adjusted by a user.

A further object of this invention is to provide a vibratory feeder control which, after meeting certain conditions, automatically discontinues its control operation when a loss of feedback is detected.

A still further object of this invention is to provide a vibratory feeder control which includes means for connecting an external DC power source so that the output can be further selectively adjusted.

Other objects and advantages of the invention will be apparent from the following detailed description.

In accordance with the present invention, there is provided a control for regulating the AC voltage provided to a vibratory feeder. The control includes electronic circuitry for generating a "desired" voltage signal, feedback circuitry for generating an "actual" voltage signal, a logic circuit for comparing the "desired" and "actual" voltage signals and generating a difference signal, and a controller which uses the difference signal to generate a control signal for regulating the AC voltage provided to the feeder. An initialization circuit enables the control a predetermined time after AC power is applied and an automatic relay couples a DC power source to the control for selective adjustment of the control output. A fault circuit automatically shuts down the control if the feedback signal is lost when the "desired" voltage signal is at or turned down to a predetermined level.

DESCRIPTION OF THE PREFERRED EMBODIMENTS

While the invention will be described in connection with particular preferred embodiments, it will be understood that it is not intended to limit the invention to those particular embodiments. On the contrary, it is intended to cover all alternatives, modifications and equivalents as may be included within the spirit and scope of the invention as defined by the appended claims.

Figure 1:
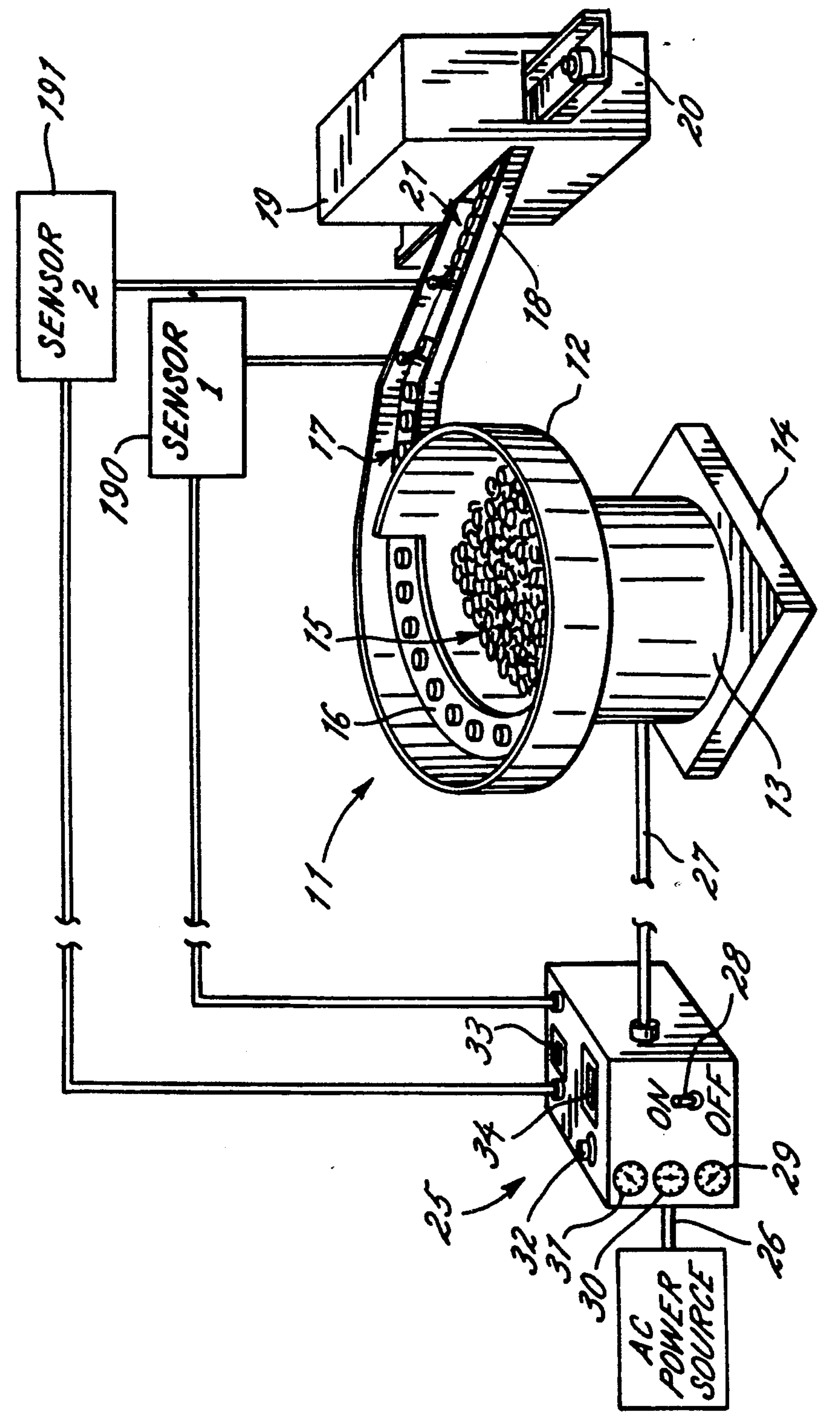
FIG. 1 is a diagrammatic illustration of a vibratory feeder and control arrangement.

Turning now to the drawings and referring first to FIG. 1, there is shown a vibratory feeder 11 having a parts-bearing bowl 12, an intermediate vibrating portion 13 and a base 14. Vibration of the bowl 12 moves the parts 15 along an interior circumferential track 16 and out of the bowl 12 onto a straight feeder track 17. The parts move along the track 17 to a machine feed track 18 feeding an assembly machine 19 on an assembly line 20. As shown, the machine feed track 18 gravity feeds the parts 15 to the assembly machine 19 and there is a temporary storage of parts 21 for insuring that the assembly machine 19 always has a ready supply of parts. Sometimes a separate vibrator (not shown) rather than gravity powers the machine feed track. The feed rate of the parts 15 out of the bowl 12 must be set at some fraction above the machine cycle rate at which the parts 15 are fed into the machine 19 so that there is always a temporary supply of parts 21.

A feeder control 25 constructed in accordance with the invention receives electrical power from an AC power source via an electrical cable 26 and controls the AC power fed through power input line 27 connected to an exciting electromagnet (i.e., solenoid 13*a*—shown in FIG. 2) inside the intermediate bowl vibrating portion 13 of the vibratory feeder 11. The vibratory feeder control 25 has an on-off switch 28 to completely disconnect the AC power source from the vibratory feeder and also has a main power control knob 29 for adjusting the "desired" level of power coupled to the feeder 11. A minimum power control knob 30 and a maximum power control knob 31 are provided, respectively, for adjusting the minimum and maximum voltage levels provided to a main control potentiometer (described further hereinafter) that is adjusted using the main power control knob 29. A selector switch (e.g., push-button) 32 is provided to set the mode of operation of the control 25 as either half cycle DC (60-pulse) or full cycle AC (120-pulse) and an activation switch 33 is provided for selecting either a "run" or "rest" condition. When the on-off switch 28 is set to the "on" position and the activation switch 33 is set to the "run" position, the control 25 is operational and a light-emitting diode (LED) 34 illuminates.

Figure 2:
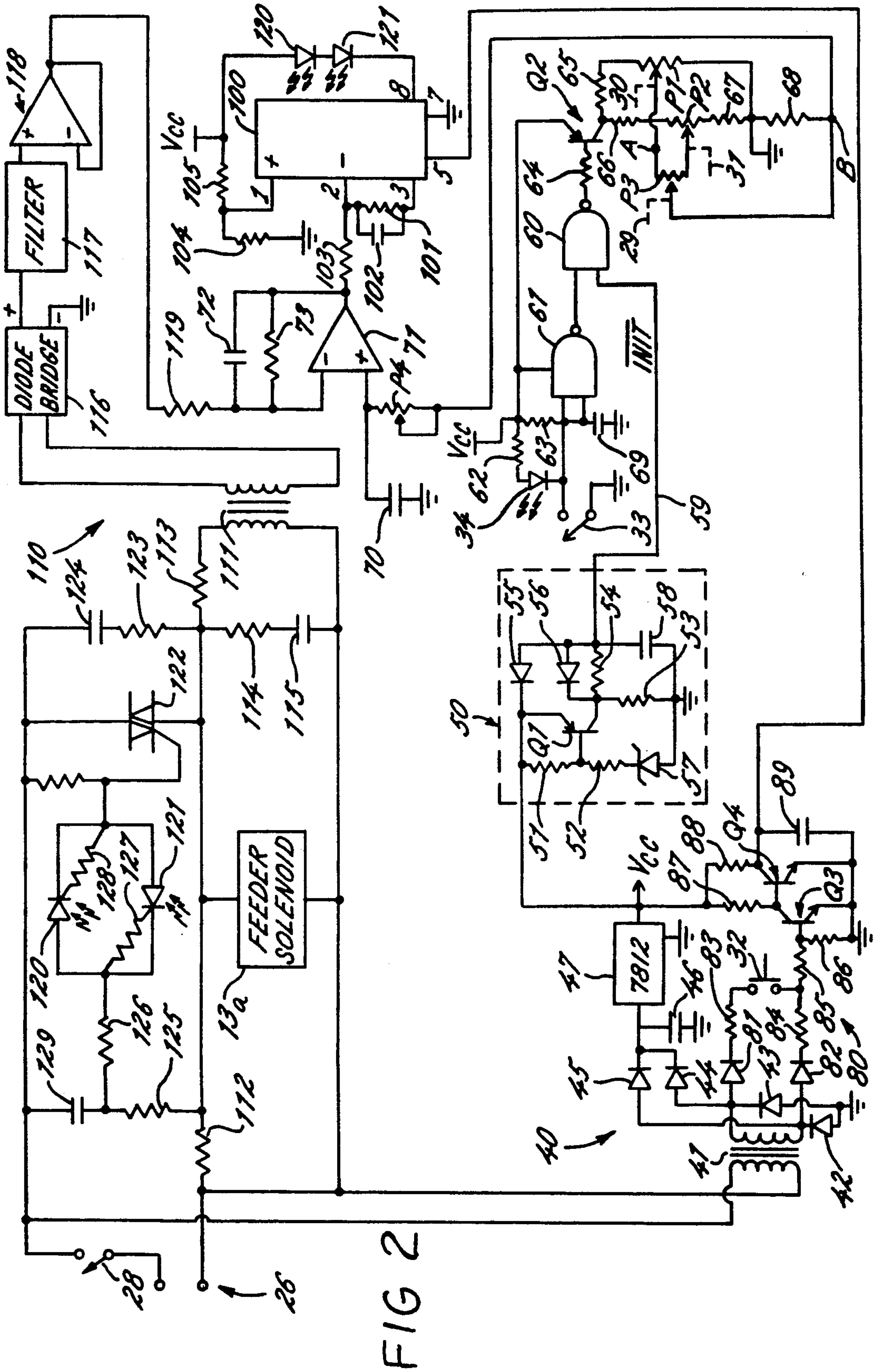
FIG. 2 is a detailed electronic schematic of a preferred embodiment of the invention.

The circuitry for a preferred embodiment of the control 25 is shown schematically in FIG. 2. When AC power is initially applied to the control 25, a VCC (power) supply 40 for the circuitry quickly builds up and stabilizes. The power supply 40 is of conventional design, comprising a step-down transformer 41, a full wave rectifier (consisting of diodes 42-45), a 1000 $\mu$F filter capacitor 46 which provides an unregulated DC output, and a voltage regulator 47 (typically part No. 7812). The voltage regulator 47 supplies a regulated output VCC for the entire system circuit. Due to the presence of the transformer 41, the regulated output VCC is isolated from the AC line potential, making the control substantially more safe for an operator to use than the prior art control units.

Initialization circuitry, generally designated 50, comprised of resistors 51-54, diodes 55-56, zener diode 57, transistor Q1, and capacitor 58, prevents the control 25 from operating until the initialization (active low) line 59 goes "high" (i.e., to approximately a 12 VDC level, the level of VCC). As will be readily appreciated, the time required for the initialization line 59 to go high is determined primarily by the time constant of the RC circuit comprising resistor 54 and capacitor 58. When power is applied, the initial voltage across capacitor 58 is 0 (zero) volts. As VCC approaches 10-12 V, transistor Q1 begins to conduct, since its base lead is preferably at a fixed voltage of approximately 8-9 V (provided by zener diode 57). Transistor Q1 thus supplies current through resistor 54 to charge capacitor 58. Capacitor 58 is eventually charged to a level that is high enough to allow controller operation (i.e., an initialization signal $\overline{\text{INIT}}$ is produced).

Of course, when the control 25 is powered down in either the "run" or "rest" mode, the initialization circuitry 50 quickly de-energizes the control circuit. More specifically, as VCC falls to approximately 8-9 volts, transistor Q1 turns off and the charge across capacitor 58 bleeds off rapidly through diode 56 and resistor 53. Some charge is also removed through diode 55, depending upon the rate of decline of VCC. As a result, the initialization line 59 rapidly falls to zero volts while VCC is still at a 6-10 volt level. This inhibits a NAND gate 60 of the control's run circuit, thereby "killing" power to the control adjustments.

The run circuit is comprised of NAND gates 60 and 61, transistor Q2, adjustment trim potentiometers P1-P4, resistors 62-68 and capacitors 69 and 70. The run circuit is enabled by bringing the inputs of NAND gate 61 to a low state (i.e., by closing the switch 33). This "run" condition is announced by the illumination of a "run" LED 34. If power has not been recently removed and reapplied, the initialization line 59 will already be in a high state, thus allowing NAND gate 60 to turn on transistor Q2.

Transistor Q2 supplies the minimum and maximum output voltage circuits with a voltage reference. By independently setting the value of minimum and maximum adjustment potentiometers P1 and P2 (using control knobs 30 and 31), the lowest voltage level—as low as 0 V—and the highest voltage level that can appear across 100KΩ main control potentiometer P3 are determined. As a result, the wiper of the main control potentiometer P3 can be adjusted using main power control knob 29 to provide any "desired" voltage between the independently established minimum and maximum voltage settings.

This "desired" voltage setting (i.e., demand signal) is applied through an RC circuit comprising capacitor 70 and trim potentiometer P4 to the non-inverting input of an op-amp 71 (configured in well-known fashion with a capacitor 72 and resistor 73 as a difference integrator). The combination of trim potentiometer P4 and capacitor 70 provides an R-C time constant that generates a desired "ramp" feature. This time constant determines how fast the "desired" input signal to the differencing integrator 71 will rise, and ultimately, the rate of AC voltage output rise of the controller output. If the wiper of the main control potentiometer P3 is turned down so that the "desired" voltage is reduced, capacitor 70 discharges through trim potentiometer P4 and resistor 68 for a smoother ramp down of the controller output voltage.

The control circuit further includes circuitry (generally designated 80) for generating a sawtooth ramp waveform. Diodes 42, 43, 81 and 82 coupled to transformer 41 are used to supply either a full wave or half wave rectified DC signal through resistors 83-86 to a transistor Q3, as determined by the position of switch 32. Switch 32 determines the controllers' mode of operation, the output being either half wave DC (60-pulse) or full cycle AC (120-pulse). The collector leads of transistors Q3 and Q4 are coupled through resistors 87 and 88, respectively, to the VCC supply. Transistor Q3 is turned on when a rectified DC signal is applied to its base lead and a low duty cycle square wave results at its collector. The square wave is a direct synchronous signal with respect to the zero crossing points of the AC line voltage, and is used to turn transistor Q4 on and off. During the off time of transistor Q4, a capacitor 89 charges through resistor 88. The resulting waveform at the collector of Q4 is a sawtooth ramp, with the top of the ramp representing the end of a sinusoidal cycle and the bottom of the ramp the beginning of a sinusoidal cycle.

Upon appearance of a "desired" signal at the non-inverting input of the differencing integrator 71, the output voltage of that integrator rises and provides a voltage level which intersects the ramp waveform derived at the collector of transistor Q4. This comparison (i.e., intersection) occurs inside an integrated circuit (controller) 100, typically used for the pulse-width modulation control of switching power supplies. As will be appreciated, without feedback the output of the differencing integrator 71 would quickly rise to saturation, causing a maximum output pulse width to appear at the output of the controller 100.

In accordance with an important aspect of the present invention, a feedback circuit (generally designated 110) is used to generate a signal indicative of the "actual" voltage provided to the solenoid 13a of the feeder 11. Transformer 111 is the primary component in the feedback loop. A 20KΩ, 6.5 W resistor 112 and the transformer 111 serve as the load when no real load is connected to the controller output. In the unlikely event that there is no load and resistor 112 is damaged, a fusing resistor 113 in series with transformer 111 limits the amount of current through the transformer to a safe level. Another resistor 114 and a capacitor 115 provide a series R-C network across transformer 111, which network is a shunt to limit the max voltage that can appear across the load terminals.

As soon as an output voltage appears across the feeder solenoid 13a (i.e., load), a voltage is induced in the secondary of transformer 111. This voltage is full wave rectified by a diode bridge assembly 116, passed through a filter circuit 117 of well-known design, and, to eliminate any possible loading effects on the filter 117 and the feedback voltage, passed through a voltage follower 118. Ultimately, this feedback signal is provided through a resistor 119 to the inverting input of the differencing integrator 71, with the net result being an output voltage from the differencing integrator based upon the difference between the feedback ("actual") voltage signal and the "desired" voltage signal.

In operation, if the AC line voltage input to the control 25 drops, the feedback voltage signal will also drop. Within about 50–100 mS, the output of the differencing integrator 71 will rise—due to the greater difference between the feedback and "desired" voltages. This in turn, as will be explained hereinafter, causes the output voltage of the controller 100 to rise until the feedback voltage is equal to the "desired" voltage. The overall net result, therefore, is a regulated AC output voltage. It is important to note that the response time of the control circuit is largely dependent upon the filtering time in the feedback voltage conditioning circuit (components 111, 116 and 117) and the response time of the integrator 71. The integrator response network (components 72, 73 and 119) is preferably chosen for the smoothest response to the "desired" and feedback voltage signals from different types of resistive and inductive loads, and for the quickest possible response time.

Controller 100 is a switchmode pulse width modulation control circuit (such as Motorola TL 494) used as a pulse width modulator comparator and phase-controlled driver for a pair of opto-coupler devices 120, 121. These devices, in turn, fire (turn on) a triac 122 at an appropriate time in the AC cycle, whereby the voltage applied to the solenoid 13a corresponds to the selected "desired" voltage.

Figure 3:
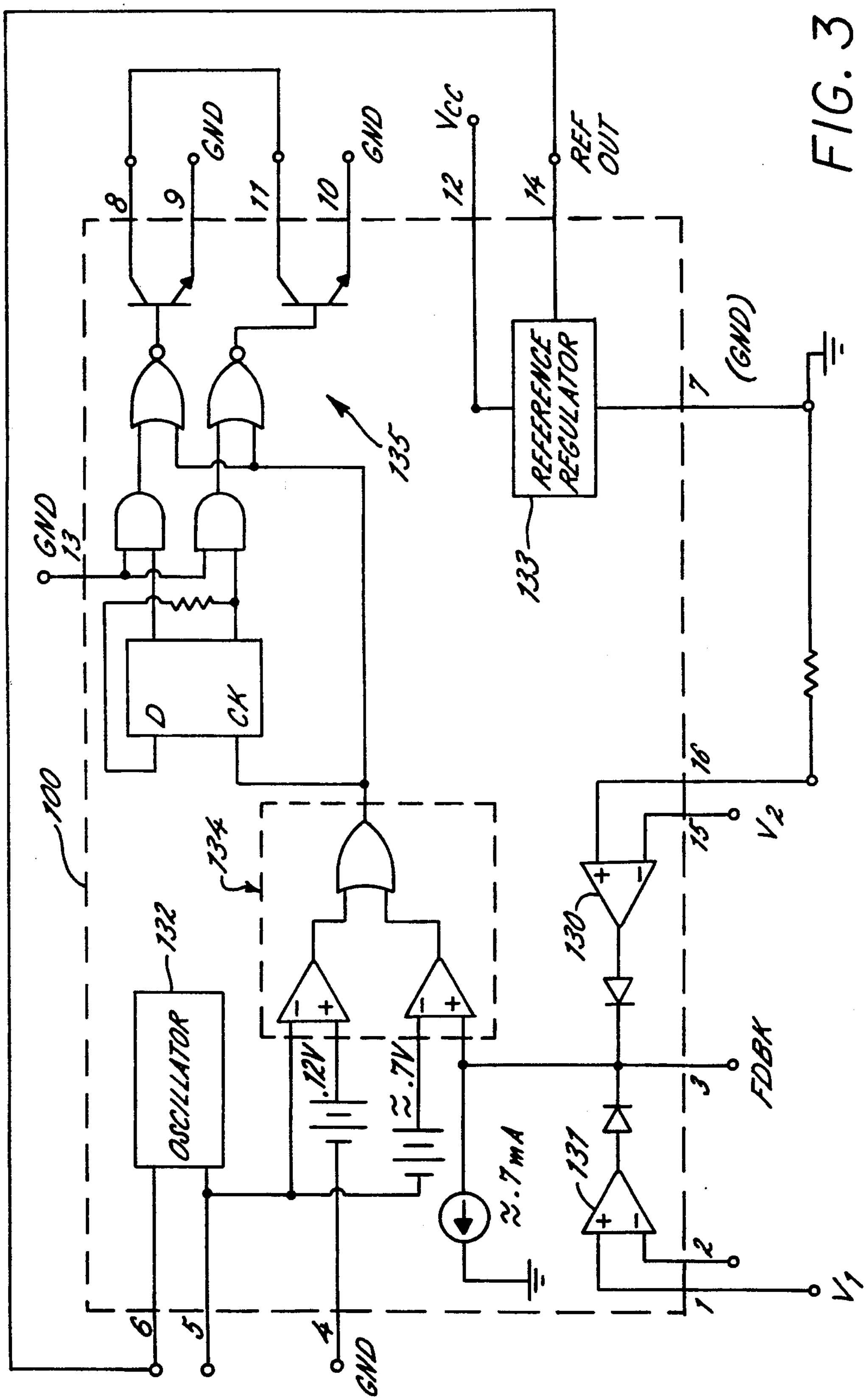
FIG. 3 is an electronic schematic of the pulse width modulation control device 100 of FIG. 2.

. As shown in FIG. 3, the controller 100 basically comprises two diode OR'd error amplifiers 130, 131, an oscillator 132, a voltage reference 133, a dead time comparator 134, and a pair of output drivers 135 normally used for push-pull type driver applications in switch mode power supplies.

The output duty cycle of the controller 100 can be varied by placing an input voltage on the Dead Time Control Input (pin 4). Since it is preferable here that the controller be able to reach a maximum duty cycle of at least 90%, pin 4 is tied to ground. As will be appreciated, tying the Output Control (pin 13) of the controller to ground eliminates the push-pull (or alternate) mode of operation for the output drivers 135. Instead, both drivers are driven simultaneously for every output pulse from the comparator 134. The built in oscillator 132 is not used; instead, the sawtooth ramp waveform developed at the collector of transformer Q4 is used as the reference oscillator. Specifically, the sawtooth ramp waveform is provided to the inverting input of the pulse width modulated comparator 134 via pin 5 of controller 100.

Error amplifier 13 1 is configured (with resistors 101, 103 and capacitor 102—FIG. 2) as a differential amplifier and receives a predetermined voltage V1 (set by a voltage divider circuit comprising resistors 104, 105). Thus, as the output of the differencing integrator 71—which is applied to pin 2 of the controller 100—increases, the output of error amplifier 131 decreases and appears at feedback pin 3 of the controller. This resulting output of error amplifier 131 also is supplied to the non-inverting input of the pulse width modulated comparator 134. The output generated by the pulse width modulated comparator 134 is, therefore, a usable, phase-controlled trigger pulse which is provided to the NOR gates and, consequently, the transistors of the output drivers 135. These transistors are connected in parallel such that, when they are turned on by the phase-controlled trigger pulse from comparator 134, they drive optically-coupled SCRs (120, 121—FIG. 2), which in turn gate the triac 122 "on". A desired level of voltage is thus provided to the solenoid 13a.

As will be readily appreciated from the foregoing, the "desired" voltage signal and the feedback signal determine the nature of the phase-controlled trigger pulse by determining where and when the output of the differential amplifier 71 intersects the ramp waveform provided by the ramp circuit 80. For example, the lower the differential amplifier output voltage level, the earlier the ramp waveform is intersected. Since the ramp waveform is the AC line zero-crossing reference, an intersection at or near the bottom of the ramp causes triggering of the triac 122 at a point very early in the AC cycle. The triac will, in that situation, deliver maximum power to the feeder solenoid 13a .

In connection with the triac-firing circuit, a resistor 123 and capacitor 124 are preferably included to provide surge (transient) protection for the triac 122 and resistors 125–128 and capacitor 129 provide surge protection for the optically-coupled SCRs 120, 121. In addition, varistors (not shown) can be used to provide transient protection for the triac, optically-coupled SCRs and AC input to the control.

Figure 4:
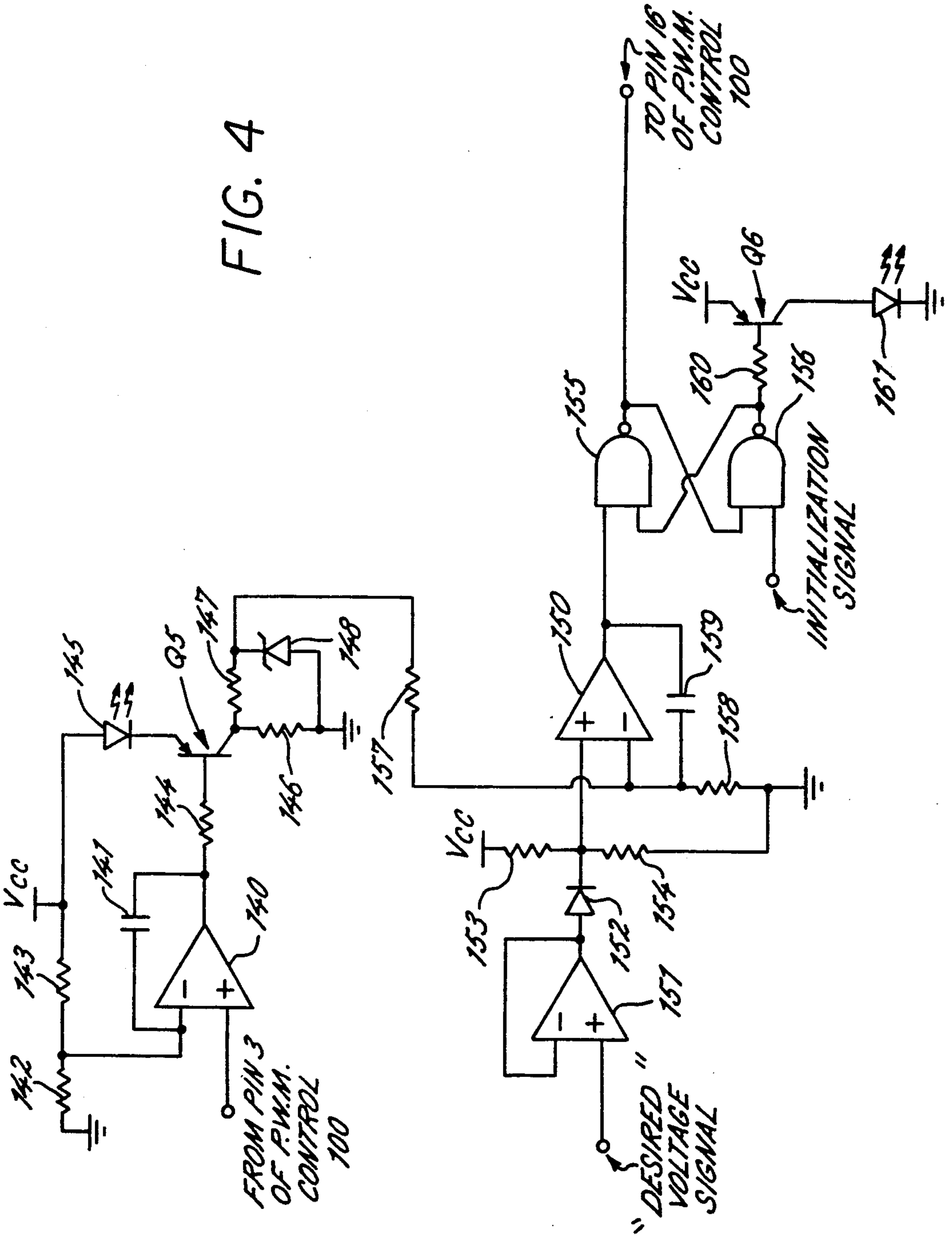
FIG. 4 is an electronic schematic of preferred embodiments of maximum value indicator and fault circuits used in conjunction with the invention.

In a preferred embodiment of the inventive control, there is further provided circuit means for visually indicating that the output of the controller 100 has reached a maximum value and for automatically discontinuing the control operation when a loss of feedback is detected at low "desired" voltage levels. More specifically, as shown in FIG. 4, an op amp 140—configured with capacitor 141 as a comparator—receives a voltage of approximately 0.75 V at its inverting input from a voltage divider circuit 142, 143. The non-inverting input of amplifier 140 is tied to pin 3 of the controller 100.

Since the differencing integrator 71 amplifies the difference between the "desired" voltage signal and the feedback voltage signal, its output will quickly saturate once the output of the controller 100 has reached a maximum value. This, of course, occurs because the feedback signal cannot increase once the controller output reaches maximum and, therefore, any further increases in the "desired" signal will saturate the output of the differencing integrator 71. This, in turn, causes the output of the differential amplifier 131 (FIG. 3) to fall to a minimum possible level—a level of about 0.7 to 1.0 V indicates maximum controller output.

The output of comparator 140 is provided through a resistor 144 to the base lead of transistor Q5, so that when that output goes low (i.e., when maximum controller output occurs), transistor Q5 turns on, which in turn illuminates an LED 145—the "maximum output" indicator. This visual indicator provides an effective means for determining the optimum setting of the maximum output potentiometer P2.

As will be further appreciated in connection with FIG. 4, once transistor Q5 is turned on, a potential is established across resistors 146, 147 and zener diode 14B is forward biased, which maintains a constant DC level at the inverting input of an amplifier 150, configured as an integrator. A second amplifier 151 provides a voltage follower which monitors the level of the "desired" voltage setting (at the non-inverting input of differencing integrator 71—FIG. 2). A signal representative of the "desired" voltage level is provided by the voltage follower 151 through a diode 152 and a divider network 153, 154 to the non-inverting input of the integrator 150.

The output of the integrator 150 is typically high, thereby maintaining a high input on a latch circuit comprising a pair of interconnected NAND gates 155, 156. In the event that the feedback signal normally provided to the differencing integrator 71 is lost, the inverting input of the integrator 150 goes high—to a level of 2.5 to 3.0 V, as determined by zener diode 148 (preferably 8 V) and resistors 157, 158. This voltage level corresponds to the lowest possible "desired" voltage level required to reach maximum output of the controller 100 when driving inductive and resistive loads in 60 and 120 pulse modes. Thus, if the "desired" setting is at, or turned down below, 2.5 to 3.0 V (as monitored by the non-inverting input of integrator 150) and maximum output is still indicated, a fault exists.

In that situation, the output of integrator 150 will ramp down at a rate determined by resistor 157 and capacitor 159, thereby setting the "fault" latch 155, 156. When set, the low output of NAND gate 156, provided through a resistor 160, turns on transistor Q6 and illuminates a fault-indicating LED 161.

At the same time, the high output of NAND gate 155 is provided to pin 16 of controller 100, thereby forcing the non-inverting input of error amplifier 130 (FIG. 3) high. Since the outputs of error amplifiers 130 and 131 are diode OR'd together, with the error amplifier having the highest level controlling, error amplifier 130 assumes control in a "fault" situation. The output of amplifier 130 (configured as a comparator) saturates high, which effectively shuts down the control circuits 134, 135 by placing the DC intersect level above the top of the ramp waveform provided at pin 5. Thus, the latch prevents controller 100 from operating until power is removed and reapplied. Upon reapplication of power, if a fault condition still exists, the output of the controller 100 will once again be forced to zero volts. Thus, the "fault" circuit provides an effective way of protecting the load (i.e., solenoid 13*a* ) and the control itself and notifies a user that there is a problem.

Another feature of the preferred embodiment of this invention is the inclusion of a switching circuit for automatically connecting an external DC supply to the control circuits once those circuits have been initialized. This DC supply can be used to selectively adjust the output of the control.

Figure 5:
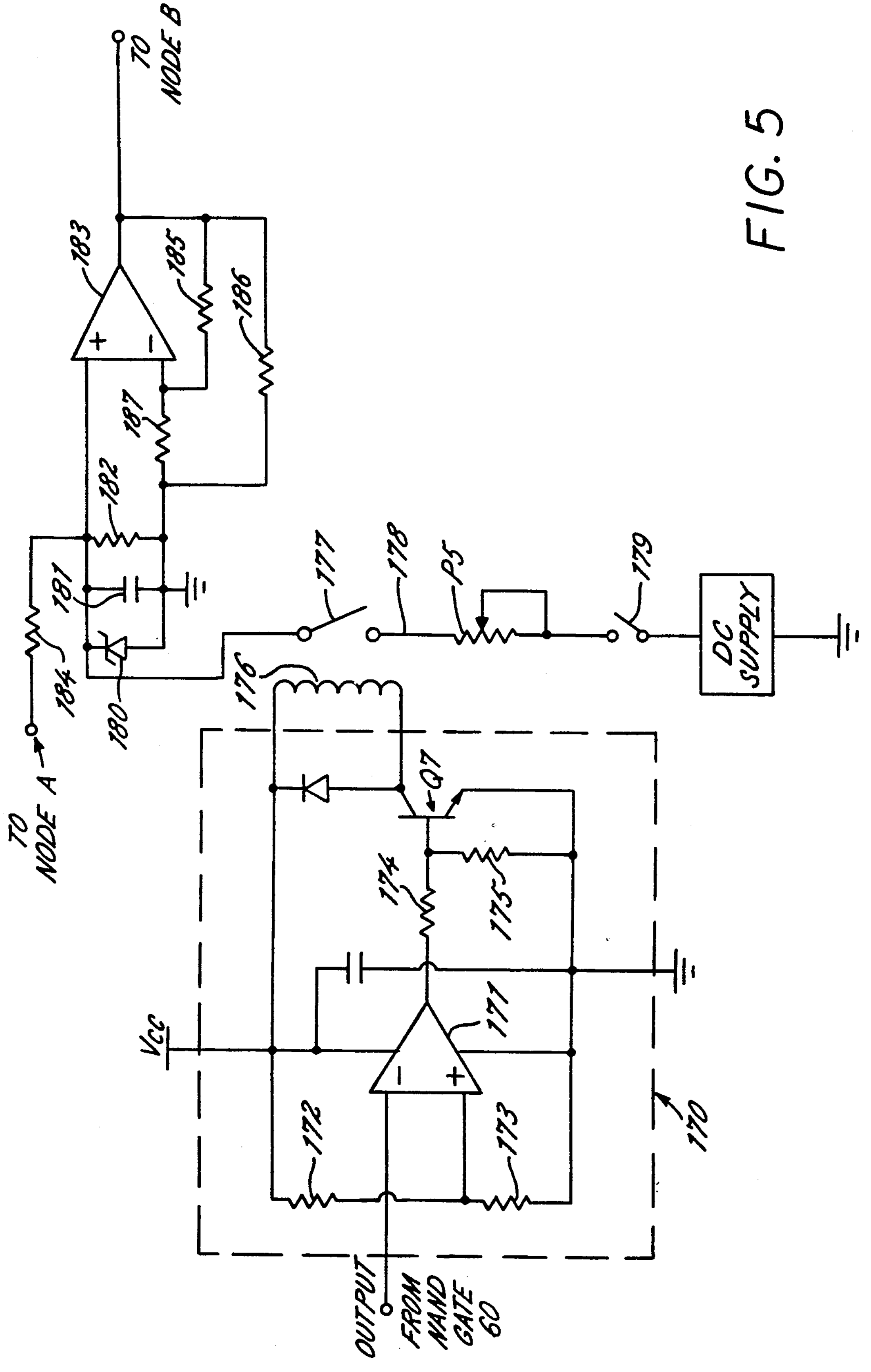
FIG. 5 is an electronic schematic of an automatic relay for a DC power source used in conjunction with the invention.

Referring to FIG. 5, there is shown an automatic relay circuit 170 for coupling an external DC supply to the control circuit. This circuit includes an op amp 171, which receives the output from NAND gate 60 (FIG. 2) at its inverting input and has a biasing voltage provided at its non-inverting input by a voltage divider network (comprising resistors 172, 173). A predetermined time after AC power is supplied to the control circuit, the initialization circuit 50 enables NAND gate 60 and, if the switch 33 is set in the "run" position, the output of NAND gate 60 goes low. Accordingly, the output of op amp 17 in the relay circuit goes high, which output is provided through resistors 174, 175 and turns on a transistor Q7. This, in turn, permits current to run through a relay coil 176 and causes a relay switch 177 to close, thus connecting the DC supply line 178 to the control circuit.

A manual switch 179 is also provided so that the DC supply can be disconnected from the control circuit regardless of the state of automatic relay switch 177.

As will be appreciated, DC supplies of various sizes (e.g., 0–5 VDC, 0–10 VDC or 0–20 VDC) may be available for use in connection with the inventive control. Circuitry is, therefore, provided to accommodate many different power supplies. Specifically, a trim potentiometer P5 is provided to scale the input DC voltage and a zener diode 180 is provided to limit the voltage level (e.g., preferably about 8 V maximum) developed across an RC circuit—capacitor 181 and resistor 182—and provided to the non-inverting input of op amp 183. The non-inverting input of op amp 183 is also connected through a resistor 184 to node A (FIG. 2) in the resistive network that is used for setting the "desired" voltage signal (i.e., to the wiper of potentiometer P1). Op amp 183, in conjunction with resistors 185–187, provides an isolation and gain block—preferably having a gain of at least 2. This block makes it possible for a user to utilize even a relatively small (0–5 VDC) supply in connection with the control circuit and eliminates loading effects which otherwise would result from tying a DC supply to node B of the control circuit (FIG. 2).

In operation, the relay circuit 170 couples an external DC source input to the control circuit whenever the control circuit is enabled. This DC input signal may be used to adjust the output of the control in lieu of, or in conjunction with, the main control potentiometer P3. To prevent possible damage to the control, the relay circuit 170 disconnects this external DC input whenever the control is de-energized.

Figure 6:
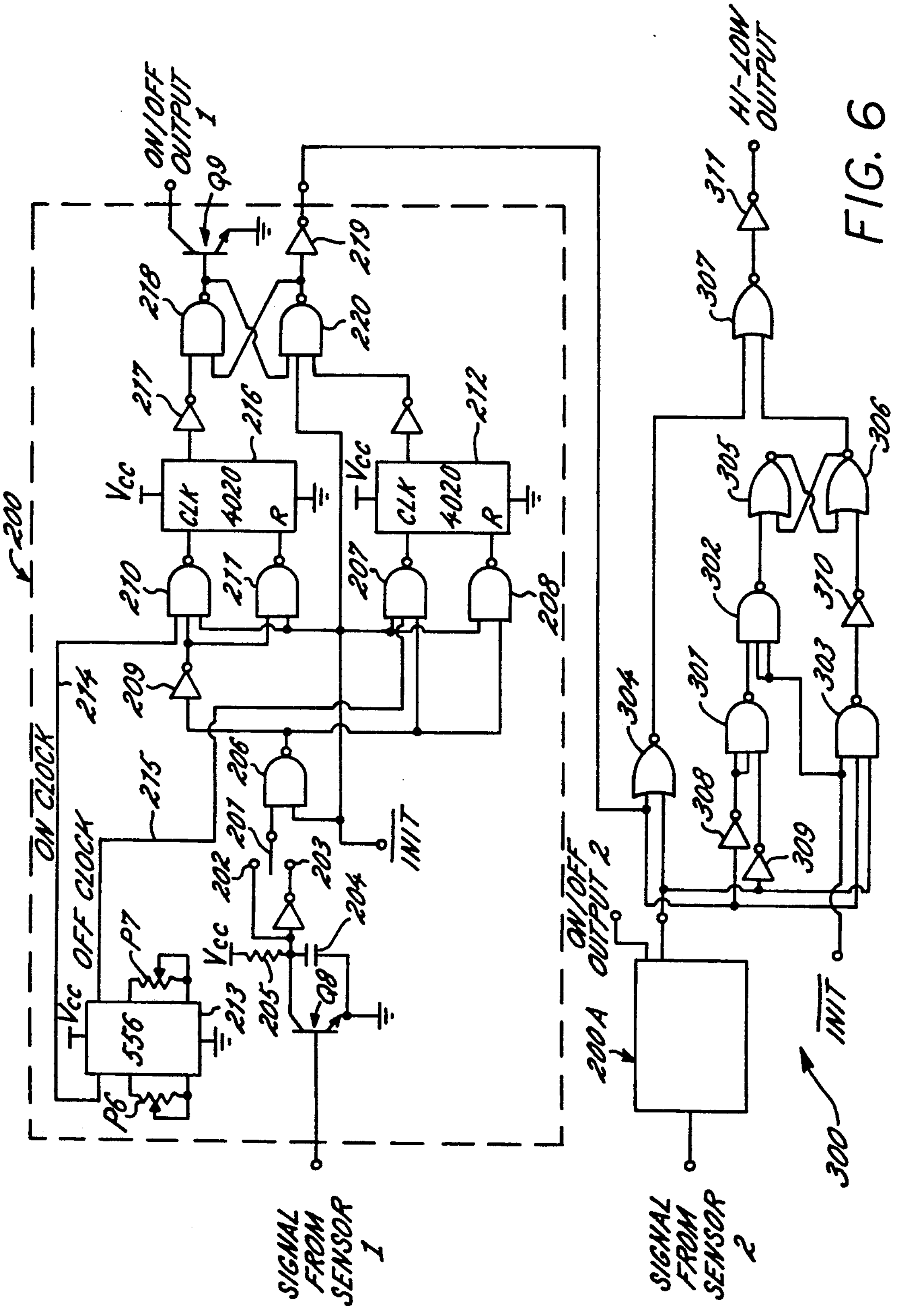
FIG. 6 is an electronic schematic of delay and on/off control logic circuits used in conjunction with the invention.

An important advantage provided by the inventive control circuit and, particularly, its utilization of digital logic components and the initialization circuit, is that it permits the use of digital logic circuits for independently determining "on" and "off" delays and, generally, the on/off operation of the vibratory feeder. Preferred embodiments of digital logic circuits for providing desired delays and determining the on/off operation of the feeder are schematically illustrated in FIG. 6.

It is well-known to use a parts detection sensor 190 (shown in FIG. 1) to determine if a pile-up of parts 21 has developed on the machine feed track 18. For example, proximity sensors and fiber optic sensors have been effectively utilized to perform this function. When a part comes into close proximity to a proximity sensor or blocks the light path of a fiber optic sensor, the sensor generates a signal. The duration of the signal depends, of course, on the duration of time that the part remains near (or blocks) the sensor.

It is desirable to shut off the vibratory feeder 11 when a pile-up of parts 21 is detected, and to turn on the feeder again when the backlog of parts is depleted. It is not desirable, however, to shut the feeder on and off at a rate equal to the passage of individual parts, so a delay is built into the control logic. This delay may be an "on" delay in which the feeder is turned on at some predetermined time after the parts detection sensor senses the absence of a pile-up of parts on the machine feed track, or it may be an "off" delay during which the feeder stays on a predetermined time after a pile-up of parts is detected.

The signal from a sensor 190 is provided to the input of a delay circuit 200. For purposes of explaining the preferred embodiment of the delay circuit, it will be assumed that the sensor signal has a logic value of "0" when the sensor is not blocked and a logic value of "1" when it is blocked, but it will be understood, of course, that—dependinq on the type of sensor actually used—the opposite signal orientation is possible. The delay circuit 200 includes a switch 201 which can be set to either a non-inverted position 202 or an inverted position 203 to accommodate any sensor. Since it is assumed for purposes of this explanation that a sensor signal of logic value "1" is provided when the sensor is blocked, it is further assumed that switch 201 is set to the non-inverted position 202.

When the sensor 190 is clear of parts (i.e., a sensor output of "0" is generated), transistor Q8 is turned off and capacitor 204 charges through resistor 205, providing a high signal through switch node 202 to one input of NAND gate 206. The NAND gate 206, enabled by the initialization signal $\overline{\text{INIT}}$ generated by the initialization circuit 50 (FIG. 2), produces an output with logic value "0", which is applied directly to a first pair of NAND gates 207, 208 and through an inverter 209 to a second pair of NAND gates 210, 211. The output of NAND gate 208 is, therefore, forced high, resetting a counter/divider 212 (preferably comprised of an IC Part No. 4020).

An oscillator 213 (e.g., Part No. 556) generates a pair of square waveform signals that are used as clock signals. Specifically, an "on" clock signal (which has a frequency determined by adjusting trim potentiometer P6) is provided on line 214 and an "off" clock signal (which has a frequency determined by adjusting trim potentiometer P7) is provided on line 215. The "on" clock signal is applied to an input of NAND gate 210, whereupon an associated counter/divider 216 counts the square wave pulses. Once a predetermined pulse count (for example, 8 or 16 or 32) is reached, the output of the counter/divider 216 goes high and keeps counting by tracking the binary states until a reset level is received. The output of counter/divider 216 is inverted by an inverter 217 and applied to NAND gate 218 of a flip-flop, thus causing the output of NAND gate 218 to go high (i.e., latch). This, in turn, turns on transistor Q9, whereby the ON/OFF output terminal of the delay circuit 200 is coupled to ground. Of course, if the ON/OFF output terminal is connected to the inputs of NAND gate 61 (FIG. 2), the run circuit and, consequently, the entire control is enabled (i.e., the feeder is turned on) when transistor Q9 is on and the ON/OFF terminal is at logic ground potential.

When a pile-up of parts occurs and is detected, the sensor generates a signal of logic value "1". Transistor Q8 turns on and the charge stored on capacitor 204 is rapidly dissipated. The output of NAND gate 206 then goes high, thus providing a reset signal to counter/divider 216. At the same time, counter/divider 212 begins counting the pulses of the "off" clock signal. When a predetermined count is reached, the output of counter/divider 212 goes high and turns the switching transistor Q9 off. This, in turn, shuts down the control and turns off the vibratory feeder.

From the foregoing description of the delay circuit 200, it will be appreciated that the "on" and "off" delays are determined, respectively, by the frequencies of the "on" and "off" clock signals (set by the trim potentiometers P6 and P7) and the predetermined count levels required to produce logic "1" outputs from the counter/divider devices 216, 212. These delays are set independently and can be of either equal or different duration, depending on the needs of the user.

In some instances, it is desirable to simultaneously utilize two parts detection sensors, and a second delay circuit 200A (identical to delay circuit 200) is preferably provided for the second sensor 191. An example of a use of two sensors is the provision of a first (high) sensor 190 near the upper end of the machine feed track 18 and a second (low) sensor 191 near the lower end of the track. When the feeder 11 is initially turned on, no parts 15 are backed up on the track and, consequently, both the high and low sensors generate output signals of logic value "0". In that situation, it is, of course, necessary that the feeder 11 remain on. Eventually, parts will back up beyond the low sensor 191, so that its output assumes logic value "1." Nevertheless, it is preferable to leave the feeder on. When the backlog of parts finally reaches the upper sensor 190 also (such that both sensor outputs are at logic value "1"), it is desirable to turn off the feeder. After the feeder is turned off, the backlog of parts will decrease, first dropping below the high sensor (such that the high sensor output goes back to "0"). It is preferable to leave the feeder off at that point, however. Only after the backlog of parts has also dropped below the level of the low sensor (such that its output also goes back to logic "0") is it desirable to turn the feeder on again.

A Hi-Low logic circuit (generally designated 300) for providing the above-described operating sequence for the feeder is shown in FIG. 6. This circuit receives signals from both the first and second delay circuits 200, 200A which are connected, respectively, to the high and low sensors (190, 191). Specifically, a signal from each delay circuit is taken from an inverter 219 coupled to the output of NAND gate 220 in the flip-flop (and thus has the same logic value as the control signal provided at the output of NAND gate 218). Therefore, when the sensor input has logic value "0" (with, as before, switch 201 in non-invert position 202), the signal input to the Hi-Low circuit 300 has logic value "1," and vice versa.

The Hi-Low circuit 300 is comprised of a plurality of interconnected NAND gates 301–303, NOR gates 304–307 and inverters 308–311, and its output is coupled directly to the input leads of NAND gate 61 in FIG. 2 (in lieu of the output terminal of the delay circuit 200). Thus, when the Hi-Low output assumes a logic value of "0," the control is enabled and the feeder is turned on. Conversely, when the Hi-Low output is high (i.e., logic value "1"), the feeder is turned off. The following logic table describes the five-step sequence of operation of the illustrated embodiment of the Hi-Low circuit:

| | | STEP | | | | |
|---|---|---|---|---|---|---|
| | | #1 | #2 | #3 | #4 | #5 |
| High sensor signal | → | 0 (no parts) | 0 | 1 | 0 | 0 |
| Low sensor signal | → | 0 (no parts) | 1 | 1 | 1 | 0 |
| Hi-Low output | → | 0 = ON | 0 | 1 | 1 | 0 |

The logic design of Hi-Low circuit 300 is such that its output will be correct even if a user positions the high and low sensors at the wrong ends of the machine feed track 18.

As can be seen from the foregoing detailed description, the present invention provides an improved control for regulating the AC voltage supplied to the solenoid of a vibratory feeder. The AC voltage desired to be supplied to the feeder can be easily selected and/or adjusted by a user, and an external DC power source can be coupled to the control for selectively adjusting the control output. A maximum output annunciator indicates the optimum setting for a maximum adjustment setpoint for all loads placed on the controller output. The control automatically discontinues its control operation if a loss of feedback is detected when the "desired" voltage signal is at or turned down to a predetermined level. A delay circuit is also provided for independently setting "on" and "off" delay periods.

What is claimed is:

1. A control for regulating the AC voltage provided to a vibratory feeder by an AC power source, comprising:

first circuit means for utilizing user inputs to generate a demand signal having a DC level indicative of an AC voltage desired to be provided to the feeder;

second circuit means coupled to the feeder for generating a feedback signal having a DC level indicative of the actual AC voltage provided to the feeder;

logic means for receiving and comparing the demand and feedback signals and generating an output signal indicative of the difference between those signals;

a controller for receiving the output signal from the logic means and generating a phase angle controlled drive signal for regulating the AC voltage provided to the feeder; and an AC drive circuit including electronic switching means coupled between the AC power source and the feeder to provide AC voltage thereto in accordance with the drive signal, which phase angle controlled drive signal opens and closes the electronic switch so that the desired AC voltage is provided to the feeder, whereby the desired and actual AC voltages are maintained substantially equal.

2. The control of claim 1, further comprising a ramp circuit coupled between the first circuit means and the logic means, which ramp circuit controls the rate of change of the demand signal provided to the logic means.

3. The control of claim 1, wherein the first circuit means comprises an initialization circuit which generates an initialization signal, and a voltage divider circuit having at least one variable resistor which is responsive to the user inputs, the initialization signal allowing power to be applied to the voltage divider circuit after an initialization delay adequate to stabilize the voltage level in the first circuit means, whereby the demand signal is generated.

4. The control of claim 3, wherein the initialization circuit and the voltage divider circuit are electrically coupled through a logic circuit, the logic circuit being enabled by the initialization signal so that power is applied to the voltage divider circuit.

5. The control of claim 1, wherein the first circuit means comprises an initialization circuit which generates an initialization signal, and signal generating means for generating the demand signal in response to the user inputs, the initialization signal permitting power to be applied to the signal generating means after an initialization delay adequate to stabilize the voltage level in the first circuit means, whereby the demand signal is generated.

6. The control of claim 5, wherein the signal generating means comprises a voltage divider circuit having at least one variable resistor which is responsive to the user inputs, and a logic gate circuit interposed between the initialization circuit and the voltage divider circuit, the initialization signal from the initialization circuit enabling the logic gate circuit so that power is applied to the voltage divider circuit.

7. The control of claim 6, further comprising a ramp circuit coupled to the output of the voltage divider circuit for controlling the rate of change of the demand signal.

8. The control of claim 1, wherein the logic means comprises a differencing integrator.

9. The control of claim 1, wherein the controller comprises a pulse width modulation control circuit, which circuit receives the output signal from the logic means and a ramp signal derived from the AC power applied to the control, and utilizes the output and ramp signals to generate the phase angle controlled drive signal.

10. The control of claim 1, wherein the electronic switch comprises optically-coupled devices which are driven by the drive signal, and a triac coupled between the AC source and the feeder and having its gate electrode coupled to said devices, whereby the driving of said devices by the drive signal causes the triac to provide the desired AC voltage to the feeder.

11. The control of claim 1, further comprising a relay circuit which automatically connects a DC power source to the control when AC power is applied to the control, the DC power source providing a means for adjusting the control signal.

12. The control of claim 1, further comprising means for indicating that the drive signal has reached a maximum value.

13. The control of claim 1, further comprising a fault circuit which automatically stops generation of the drive signal if the feedback signal is lost when the demand signal is at or below a predetermined level.

14. The control of claim 1, further comprising a logic circuit for independently setting an on delay and an off delay, which circuit is responsive to sensor signals relating to the operation of the vibratory feeder and turns the feeder on and off, respectively, in response to the sensor signals only after the on and off delay periods have elapsed.

15. The control of claim 1, wherein means for providing the user inputs to the first circuit means are isolated electrically from the AC power source.

16. The control of claim 15, wherein a transformer provides the electrical isolation for the user input means.

17. The control of claim 1, further comprising a logic circuit responsive to signals from at least a pair of sensors that detect varying backlogs of parts that occur along an inclined track due to vibration of the feeder, one sensor being located at a higher position along the track than a second sensor, the logic circuit generating an output which turns the feeder on and off in response to the sensor signals and in accordance with a predetermined output sequence.

18. A control for adjusting the AC voltage provided to a vibratory feeder by a AC power source, comprising:

circuit means for utilizing user inputs to generate a demand signal having a DC level indicative of an AC voltage desired to be provided to the feeder, said circuit means including switch logic and an initialization circuit which generates an initialization signal, the initialization signal enabling the switch logic after an initialization delay adequate to stabilize the voltage level in the circuit means so that the demand signal can be generated;

feedback means coupled to the feeder for generating a feedback signal having a DC level indicative of the actual AC voltage provided to the feeder; and logic means for receiving and utilizing the demand and feedback signals to generate a phase angle controlled drive signal for adjusting the AC voltage provided to the feeder.

19. The control of claim 18, wherein the circuit means further includes a voltage divider circuit having at least one variable resistor which is responsive to the user inputs, the initialization signal allowing power to be applied to the voltage divider circuit, whereby the demand signal is generated.

20. The control of claim 18, wherein the logic means receives the demand signal and a ramp signal derived from the AC power applied to the control, and utilizes said signals to generate the phase angle controlled drive signal.

21. The control of claim 18, further comprising an electronic switch coupled to the feeder, the drive signal firing the electronic switch so that the desired AC voltage is provided to the feeder.

22. The control of claim 21, wherein the electronic switch comprises optically-coupled devices which are driven by the drive signal, and a triac coupled between the AC power source and the feeder and having its gate electrode coupled to said devices, whereby the driving of said devices by the drive signal causes the triac to fire and provide the desired AC voltage to the feeder.

23. An electronically regulated vibratory feeder having solenoid means for vibrating a feed bowl, the magnitude of each vibratory stroke of the solenoid means being determined by the magnitude of an electrical drive signal provided to the solenoid means, the improvement comprising:

an AC drive circuit including phase angle controlled driver means coupled between a source of AC power and the solenoid means to provide the electrical drive signals thereto;

feedback means coupled to the solenoid means for producing a feedback signal having a DC level related to the magnitude of the drive signal; and a DC control circuit, including means for generating a demand signal having a DC level indicative of the magnitude of a desired vibratory stroke, and means responsive to the demand signal and the feedback signal for establishing the phase angle of the driver to produce a stroke having a magnitude demanded by the demand signal independently of AC power fluctuation.

24. An electronically regulated vibratory feeder having solenoid means for vibrating a feed bowl, the magnitude of each vibratory stroke of the solenoid means being determined by the magnitude of an electrical drive signal provided to the solenoid means, the improvement comprising:

an AC drive circuit including phase angle controlled driver means coupled between a source of AC power and the solenoid means to provide the electrical drive signals thereto;

a DC control circuit, including means for generating a demand signal having a DC level indicative of the magnitude of a desired vibratory stroke, means for generating a DC ramp waveform signal from the power supplied by the AC source, and means responsive to the demand signal and the ramp waveform signal for establishing the phase angle of the driver to produce a stroke having a magnitude demanded by the demand signal independently of AC power fluctuation.

25. An electronically regulated vibratory feeder having solenoid means for vibrating a feed bowl and an AC drive circuit including phase angle controlled driver means coupled between a source of AC power and the solenoid means for providing electrical drive signals to the solenoid means, the improvement comprising:

a DC control circuit, electrically isolated from the AC power source, which generates a signal for establishing the phase angle of the driver in response to user inputs; and a logic circuit responsive to sensor signals indicative of at least predetermined upper and lower threshold levels of a varying backlog of parts that results from vibration of the feed bowl, the logic circuit generating an output which turns the feeder on and off in accordance with receiving a predetermined sequence of the sensor signals.

26. The control of claim 25, wherein the logic circuit operates in a continuous sequence which turns the feeder on when the sensor signals indicate that the backlog level exceeds neither the lower nor upper threshold, keeps the feeder on when the backlog increases to a level exceeding only the lower threshold, turns the feeder off when the backlog increases to a level exceeding both the lower and upper thresholds, keeps the feeder off when the backlog decreases to a level below only the upper threshold, and turns the feeder on again when the backlog decreases to a level below both the lower and upper thresholds.

27. The control of claim 25, wherein the upper and lower threshold levels are determined by the relative positions of a pair of sensors along an inclined parts-receiving track connected to the feed bowl.

* * * * *